Dec. 31, 1935.    L. V. BLACK    2,025,716
INSULATING GLASS
Filed Oct. 6, 1933

INVENTOR
LLOYD V. BLACK.
BY
ATTORNEYS.

Patented Dec. 31, 1935

2,025,716

UNITED STATES PATENT OFFICE 2,025,716

INSULATING GLASS

Lloyd V. Black, Tarentum, Pa., assignor to Pittsburgh Plate Glass Company, a corporation of Pennsylvania Application October 6, 1933, Serial No. 692,467

3 Claims. (Cl. 20—56.5)

Figure 1:
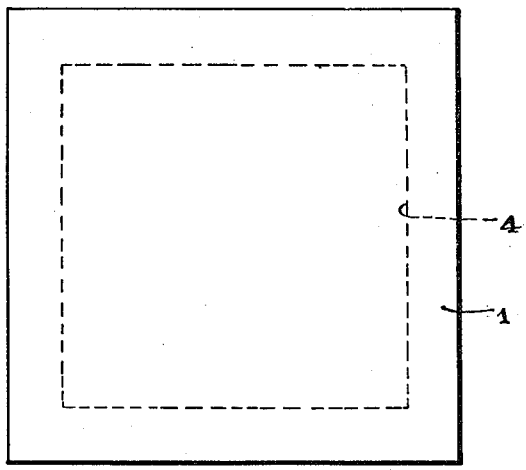

The invention relates to insulating glass which consists of sheets of glass arranged in parallel to provide an air space therebetween and secured together and seated at the edges. The invention has for its objects the provision of a product of the kind specified having improved means for securing the glass sheets together at their edges and sealing them. A further object is to provide a securing and sealing means which shall be permanent in character; which will insure a tight seal after a long period of service; and which will always yield somewhat and adjust itself to any bending of the glass sheets due to varying atmospheric pressures, so that any breakage or edge separation due to such bending, is guarded against. One embodiment of the invention is shown in the accompanying drawing, wherein:

Figure 1 is a plan view. And Fig. 2 is a section on an enlarged scale.

Referring to the drawing, 1 and 2 are glass sheets or plates with an air space 3 therebetween and 4 is a spacer in the form of a hollow square which also acts to secure the glass sheets together and to form a seal and thus prevent a circulation of air between the space 3 and the outer air.

The spacer 4 may vary as to dimensions and may range from one-eighth to three-eighths of an inch in thickness and from three-eighths to one-half of an inch in width. It is composed of a material which is porous in character, such as cardboard, cork, "Celotex" or the like, and is treated to impregnate it with a plastic cement, such as pitch, shellac, collodion, pyroxylin or the like which has adhesive properties and will always remain in a more or less plastic condition.

Figure 2:
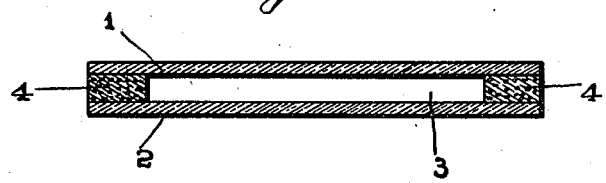

After the glass sheets and spacer are assembled, as indicated in Fig. 2, the assembly is heated to the softening points of the cement when the spacer carries a cement, such as pitch, which requires heat to soften it, and pressure is applied to press the parts tightly together. In the case of cement, such as shellac or collodion, which are soft and adhesive without the use of heat, the parts are merely assembled and placed under pressure until the cement hardens.

Since the cement holding the plates is plastic, a yielding joint between the glass sheets is secured and when the glass is bent or distorted due to varying atmospheric pressures there is no separation at the edges or no breakage, such as often occurs where two glass sheets are rigidly secured together at their edges. The distribution of the plastic cement through the body of the spacer, filling its pores, prevents any seepage of air through the spacer and insures against any deterioration of the spacer. If the air between the sheets is dry at the time of fabrication, the seal prevents any inflow of atmospheric air and moisture, and the formation of condensation on the inner faces of the glass sheets is avoided.

What I claim is:

1. In combination, a pair of similar parallel glass sheets, and a spacer of porous material between the sheets at their edges, said spacer being impregnated with a permanently plastic cement which fills the pores of the spacer material and secures the spacer to the glass sheets.

2. In combination, a pair of similar parallel glass sheets, and a spacer of porous material between the sheets at their edges, said spacer being impregnated with pitch which fills the pores of the spacer material and secures the spacer to the glass sheets.

3. In combination, a pair of similar parallel glass sheets, and a spacer of porous material between the sheets at their edges, said spacer being impregnated with cellulose plastic in solution which fills the pores of the spacer material and secures the spacer to the glass sheets.

LLOYD V. BLACK.